Sept. 30, 1952   A. T. GORMAN ET AL   2,612,412
APPARATUS FOR PREVENTING UNDESIRED RELEASE OF FLUID PRESSURE BRAKES
Filed Sept. 28, 1950
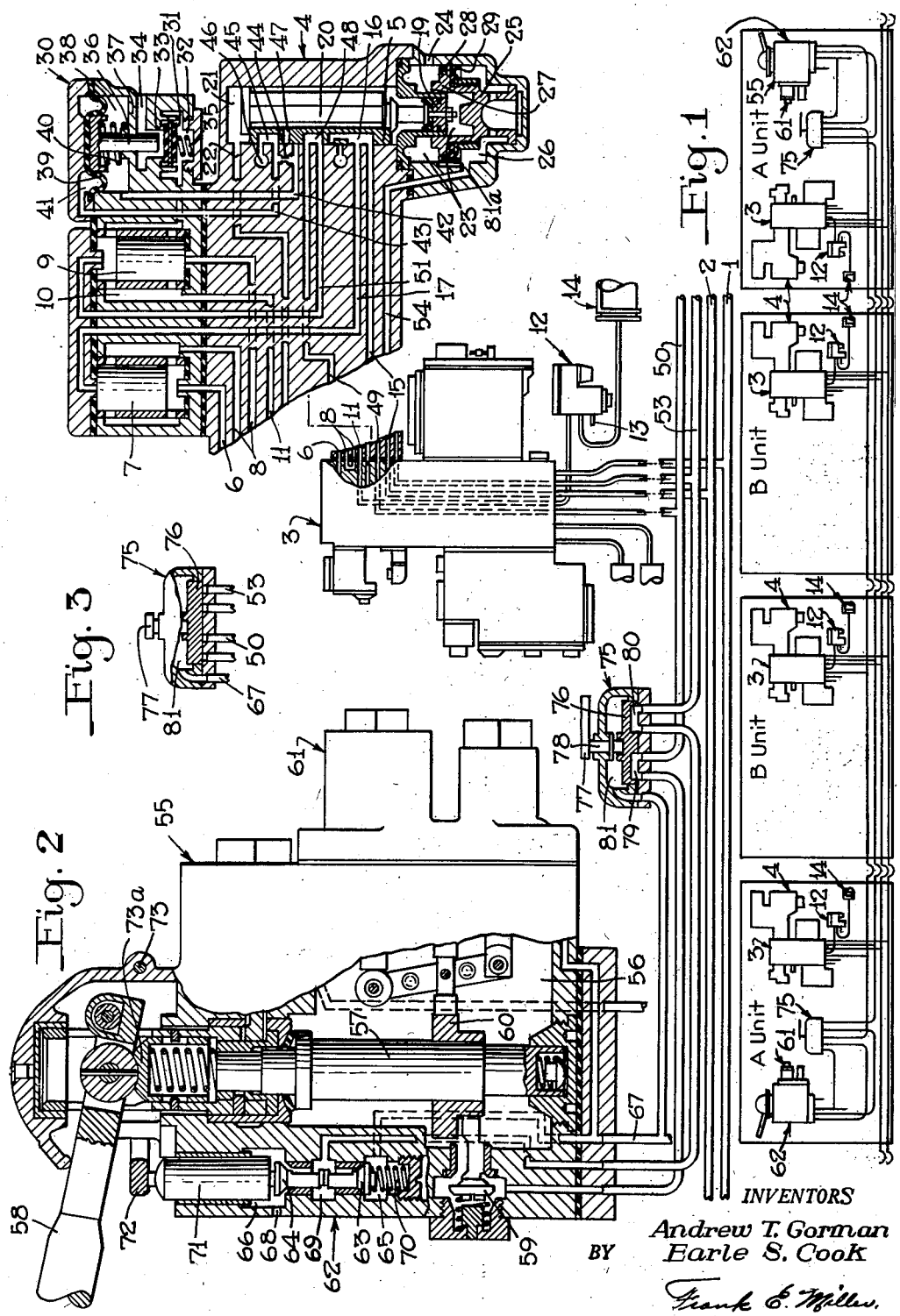
INVENTORS
Andrew T. Gorman
Earle S. Cook
BY
Frank E. Miller.
ATTORNEY Patented Sept. 30, 1952

2,612,412

UNITED STATES PATENT OFFICE 2,612,412

APPARATUS FOR PREVENTING UNDESIRED RELEASE OF FLUID PRESSURE BRAKES

Andrew T. Gorman, Pitcairn, and Earle S. Cook, Forest Hills, Pa., assignors to Westinghouse Air Brake Company, a corporation of Pennsylvania Application September 28, 1950, Serial No. 187,262

7 Claims. (Cl. 303—14)

This invention relates to fluid pressure brakes and more particularly to the type for use on railway locomotives.

The No 24RL locomotive brake equipment shown and described in Westinghouse Air Brake Company's Instruction Pamphlet No. 5066 dated March 1948 and as employed on modern multiple unit diesel locomotives arranged to be controlled from either end, comprises an engineer's automatic brake valve device on each of the end units for controlling the brakes on the locomotive and cars of a train selectively either through a brake pipe on the usual automatic principle or a straight air pipe on an electro-pneumatic principle. An engineer's independent brake valve device is also provided on each of the end units for controlling the brakes on the locomotive independently of the brakes on cars of a connected train.

When the brakes on the locomotive and cars of a train are applied by operation of the automatic brake valve device and the engineer desires to release the brakes on the locomotive without releasing the brakes on the cars of a connected train he will operate the independent brake valve device to supply fluid under pressure to an actuating pipe which extends through the several units of the locomotive. On each unit a selector piston is provided to respond to the fluid pressure thus provided in the actuating pipe and move to a release position for opening a release communication through which the brake applying fluid on the respective unit will be vented to release the brakes on the unit. Normally the actuating pipe is vented at the independent brake valve device to permit the selector pistons on the several units to assume a normal position in which the brake release communication is closed.

On each of the end units of the locomotive a brake pipe cut-out cock is provided for closing communication between the brake pipe and automatic brake valve device at the non-control end of the locomotive and for opening such communication at the control end of the locomotive. Likewise a cut-out valve device is provided in the connection between the independent brake valve device on each end unit of the locomotive and the actuating pipe and is closed at the non-control end and opened at the control end of the locomotive.

When changing control ends of the locomotive the engineer is required to operate the automatic brake valve device at the control end to effect a full service reduction in brake pipe pressure and thereby a full automatic application of brakes on the locomotive and then move the brake valve to lap position followed by closing of the brake pipe cut-out cock. The independent brake valve handle is moved to release position, if not already so positioned, in which it is normally carried while the brakes on the locomotive and cars of a train are being controlled by the automatic brake valve device, and then the cut-out valve device is closed. The automatic brake valve handle is then moved to running position which with the brake pipe cut-out cock closed has no effect upon brake pipe pressure and the application of brakes on the locomotive. Both brake valve handles are then removed and taken to the opposite end of the locomotive where they are applied to the respective brake valve devices. The brake pipe cut-out cock and cut-out valve device at that end are then opened to provide for control of the brakes on the locomotive and cars of a connected train from that end.

It will be noted that during the interval of time between closing of the cut-out valve device at the one end of the locomotive and opening the cut-out valve device at the opposite end, the actuating pipe is disconnected from exhaust through the independent brake valve devices at both ends of the locomotive and if there should be leakage through either or both cut-out valve devices to the actuating pipe of such a degree as to build up the pressure therein, during such interval of time, sufficiently to cause the selector pistons to move to their release position the application of brakes on the locomotive will be released. To reapply the locomotive brakes under such a condition it is necessary to reopen one of the cut-out valve devices for venting the actuating pipe. This takes time and in case the brake release occurs while the engineer is, for example, near the middle of the locomotive time is required to reach a cut-out valve device. In other words, such leakage might result in a dangerous situation in that a locomotive might get out of control.

The principal object of the invention is therefore the provision of means for insuring that leakage of fluid under pressure into the actuating pipe under the conditions above described cannot result in an undesired release of brakes on the locomotive.

Other objects and advantages will become apparent from the following more detailed description of the invention.

In the accompanying drawing; Fig. 1 is a diagrammatic view of a multiple unit locomotive with a portion of a 24RL locomotive brake equipment shown in outline superimposed thereon; Fig. 2 is a diagrammatic view of a portion of the 24RL locomotive brake equipment such as employed on the end units of the locomotive, and a portion of which is also employed on intermediate units of the locomotive; and Fig. 3 is a cross-sectional view of an independent brake valve cut-out valve device shown in Fig. 1 but in a different position.

Description

The fluid pressure brake equipment embodying the invention, and for use on multiple unit locomotives such as the diesel type comprising two end A units, either one of which may be the leading end of the locomotive, and one or more intermediate B units disposed between and connected to said end units, and which units are indicated in Fig. 1 of the drawing by suitable legends, generally may be like that disclosed in the instruction pamphlet above referred to, in view of which only such parts of the equipment are shown in the drawing as deemed necessary to a clear understanding of the invention and for like reasons the following description thereof will also be limited.

As shown in the drawing, reference numerals 1 and 2 designate, respectively, the brake pipe and straight air pipe of the equipment, which pipes are adapted to extend through the locomotive for connection at opposite ends thereof with corresponding pipes on a connected train. An automatic brake valve device (not shown) carried by each of the end units of the locomotive is adapted to selectively either vary the pressure of fluid in the brake pipe 1 for controlling the brakes on the locomotive and cars of a train on the usual automatic principle or to vary pressure of fluid in the straight air pipe 2 for controlling the brakes on the locomotive and cars of a train on the straight air principle.

On each of the units of the locomotive there is provided a brake controlling valve device 3 with which there is associated a selector valve device 4 comprising a slide valve 5 having a normal position in which it is shown in the drawing.

Upon a reduction in pressure in brake pipe 1 the brake controlling valve device 3 is adapted to respond thereto to supply fluid under pressure to a passage 6 from which it is adapted to flow past the lower end of a double check valve 7 to a passage 8 and thence past the lower end of a double check valve 9 to an annular cavity 10 encircling the check valve 9 and from said cavity through a passage 11 to a relay valve device 12 for operating said relay valve device to supply fluid at a corresponding pressure from a fluid pressure supply pipe 13 to a brake cylinder device 14 for actuating said brake cylinder device to apply the locomotive brakes. Upon recharging the brake pipe 1 with fluid under pressure the brake controlling valve device 3 is adapted to release fluid under pressure from passage 6 and, by reverse flow from the relay valve device 12 to cause operation thereof to release fluid under pressure from the brake cylinder device 14 to release the application of brakes.

Upon supply of fluid under pressure to the straight air pipe 2 such fluid is adapted to flow through a passage 15 in the brake controlling valve device 3, a cavity 16 in the selector slide valve 5, and a passage 17 to the upper end of the double check valve 7 and thence past said check valve to passage 8 and to the relay valve device 12 for actuating same to supply fluid at a corresponding pressure to the brake cylinder device 14 to apply the locomotive brakes. Upon release of fluid under pressure from the straight air pipe, by reverse flow through the communication just described, fluid under pressure will be released from the relay valve device 12 to cause operation thereof to vent the brake cylinder device 14 to release the brakes on the locomotive.

In addition to the slide valve 5, the selector valve device 4 comprises a piston 19 connected by a stem 20 to said slide valve and subject on one side to pressure of fluid in a valve chamber 21 containing said slide valve and adapted to be constantly supplied with fluid under pressure through a passage 22. At the opposite side of piston 19 is a chamber 23 constantly in communication with atmosphere through a vent 24. Below the piston 19 there is a coaxially arranged piston 25 of larger diameter subject on one side to atmospheric pressure in chamber 23 and arranged to abut the piston 19. At the opposite side of piston 25 is a pressure chamber 26.

The piston 25 comprises a head 27 in substantial sliding contact with the wall of a bore in the casing in which said piston operates and open to the peripheral surface of said head is a groove containing a lubricating swab 28 in contact with said wall for lubricating same. A packing cup 29 in chamber 26 is secured to the head 27 for preventing leakage of fluid under pressure from chamber 26 to chamber 23.

When fluid under pressure is released from chamber 26, pressure of fluid in chamber 21 will move the pistons 19, 25 and thereby the slide valve 5 to their lower position in which they are shown in the drawing and in which cavity 16 connects passages 15 and 17 to permit application and release of brakes from the straight air pipe 2 as above described. Upon supply of fluid under pressure to chamber 26, as will be later described, the piston 25 is adapted to move the piston 19 and slide valve 5 upwardly to a brake release position for effecting operation of an independent brake release valve device 30.

The brake release valve device 30 comprises a check valve 31 contained in a chamber 32 which is open to the annular cavity 10 encircling the double check valve 9 and thence to the relay valve device 12, and is arranged to cooperate with a seat 33 for closing communication from said chamber to an atmospheric vent port 34. A spring 35 in chamber 32 acts on the check valve 31 for urging it to its seat. A stem 36 extending through a partition wall 37 in slidable contact therewith and through the vent port 34 is arranged with its one end for engaging the check valve 31 for unseating same. At the side of wall 37 opposite port 34 is a chamber 38 formed at one side of a flexible diaphragm 39 and wherein the stem 36 is provided with a follower head engaging the adjacent face of said diaphragm, a spring 40 in said chamber acting on said head and diaphragm and normally holding said stem out of contact with the check valve 31. At the opposite side of diaphragm is a chamber 41.

The chambers 38 and 41 at opposite sides of diaphragm 39 are connected by passages 42 and 43, respectively, to the seat of slide valve 5 and to each other through a choke 44. With the slide valve 5 in its normal position, in which it is shown in the drawing, a cavity 45 therein opens passage 43 to an atmospheric port 46 whereby diaphragm chamber 41 is vented and chamber 38 is also vented by way of the choke 44, in order that spring 40 may hold stem 36 out of contact with check valve 31 so that said check valve may be seated by spring 35 to prevent dissipation of fluid under pressure supplied either by operation of the brake controlling valve device 3 or from the straight air pipe 2 for effecting operation of the relay valve device 12 to apply the locomotive brakes.

When fluid under pressure is supplied to chamber 26 to move the parts of the selector valve device 4 to their upper or independent brake release position, a port 47 in the slide valve opens passage 43 to valve chamber 21 so that fluid under pressure will flow from said valve chamber to chamber 41 to therein act on diaphragm 39 to deflect same and operate stem 36 to unseat the check valve. If at this time the brakes on the locomotive are applied either by operation of the brake controlling valve device 3 or by pressure of fluid from the straight air pipe 2, the brake applying fluid will be released from the relay valve device 12 to release the locomotive brakes, it being noted that in this upper position of slide valve 5 cavity 16 therein will be moved out of registry with passage 15 from the straight air pipe 2 to cut off supply of brake applying fluid from the straight air pipe 2 to the relay valve device 12.

In this upper position of slide valve 5 a cavity 48 therein connects passage 42 to a passage 49 leading to an application and release pipe 50 which is normally vented as will be later explained, and a portion of the fluid under pressure supplied to passage 43 will flow through choke 44 to passage 42 and said pipe, but with said pipe vented this supply of fluid to passage 42 will be without effect since the venting of said pipe will maintain diaphragm chamber 38 vented to ensure opening of the check valve 31 and release of locomotive brakes. In the normal position of slide valve 5 the cavity 48 therein opens passage 49, and hence the application and release pipe 50, to a passage 51 leading to the upper end of the double check valve 9, so that when there is no fluid under pressure acting on the lower end of said check valve, as with the brake controlling valve device 3 in its brake release position and with the straight air pipe vented, the brakes on the locomotive may be applied and released past the upper end of said double check valve by supply of fluid under pressure to and its release from the application and release pipe 50.

The application and release pipe 50 extends through the locomotive and on each unit thereof is connected to the respective selector slide valve 5 as just described. Also an actuating pipe 53 extends through the locomotive and on each unit thereof the selector piston chamber 26 is open to said pipe via a passage 54 in the respective brake controlling valve device 3. On each of the A units of the locomotive the application and release pipe 50 and actuating pipe 53 are connected to an engineer's independent brake valve device 55.

Each independent brake valve device 55 comprises a casing having a chamber 56 in which there is disposed a rotatable shaft 57 which extends to the exterior of the casing where a handle 58 is secured to said shaft for turning it from a release position, in which it is shown in the drawing, in the direction of the writer, as viewed in the drawing, into an application and release zone. The chamber 56 is open in the release position and application and release zone of movement of handle 58 past a cut-off valve 59 to the application and release pipe 50.

In chamber 56 a cam 60 in shaft 57 is provided for controlling operation of a self-lapping application and release valve device 61 which in release position of said handle is adapted to open chamber 56 and thereby the application and release pipe 50 to atmosphere. Upon movement of handle 58 into its application and release zone the cam 60 is adapted to operate the self-lapping valve device 61 to provide fluid in chamber 56 and the application and release pipe 50 at a pressure proportional to the extent of movement from the release position. It will therefore be seen that when the selector slide valve 5 is in its normal position, in which it is shown in the drawing, and when the lower end of the double check valve 9 is not subject to fluid under pressure from either the brake controlling valve device 3 or straight air pipe 2, that by operation of the independent brake valve device fluid under pressure may be supplied to and released from the relay valve devices 12, via the application and release pipe 50, for controlling the brakes on the locomotive independently of the brake pipe 1 and straight air pipe 2 and hence independently of the brakes on cars of a connected train.

Each independent brake valve device also comprises an independent release valve device 62 which in turn may comprise two poppet valves 63, 64 contained in chambers 65, 66 open to a fluid pressure supply pipe 67 and to atmosphere through a vent passage 68, respectively. The two poppet valves are coaxially arranged to seat in the direction of each other and have stems engaging each other in a chamber 69 which is connected to the actuating pipe 53. A spring 70 in chamber 65 acts on the valve 63 for urging it towards its seat and at the same time unseating the valve 64. A vertically movable plunger 71 slidably mounted in the casing is operative upon downward movement to seat valve 64 and unseat valve 63.

The plunger 71 is disposed with its outer end in engagement with a bail 72 at one side of shaft 57, said bail being hinged for vertical movement on a pin 73 at the opposite side of said shaft. The handle 58 is manually depressible relative to the shaft 57 against a spring pressed plunger 73a from a normal elevated position, in which it is shown in the drawing, into engagement with the bail 72 and for then moving said bail downward about the pin 73. Upon relief of manual pressure on handle 58 the plunger 73a is adapted to return the handle 58 to its upper position to permit seating of valve 63 and unseating of valve 64 by spring 70.

It will now be seen that if the brakes on the locomotive are applied in response to either a reduction in pressure in brake pipe 1 or supply of fluid under pressure to the straight air pipe 2 and the engineer desires to release such application independent of the brakes on a connected train, all that is required is depressing of the brake valve handle 58 in its release position to supply fluid under pressure to the actuating pipe 53 and thereby to the piston chamber 26 in the selector valve devices 4 in the several units of the locomotive, in response to which said selector valve devices will move to their upper position to cause operation of the respective release valve device 30.

A cut-out valve 75 is associated with each independent brake valve device 55 to control communication between said brake valve device and the adjacent ends of the application and release pipe 50 and actuating pipe 53.

Each cut-out valve device 75 comprises a casing containing a rotary valve 76 to which a handle 77 is connected through the medium of a stem 78 for turning said valve to either an open position (Fig. 2) or a closed position (Fig. 3). Above the rotary valve 76 is a chamber 81 open to the fluid pressure supply pipe 67 whereby fluid from said pipe will be constantly effective on said valve to hold it seated.

In the open position of the cut-out valve device 75, cavities 79 and 80 therein open the application and release pipe 59 and the actuating pipe 53 to the respective independent brake valve device 75, while in the closed position of said valve device (Fig. 3) communication between said pipes and brake valve device is closed.

When controlling brakes from either end of the locomotive the cut-out valve device 75 at that end is in its open position while at the non-control end of the cut-out valve device 75 is in its closed position.

When it is desired to change control ends of the locomotive, the engineer will operate the automatic brake valve device (not shown) at the control end of the locomotive to effect a full service reduction in pressure in brake pipe 1 to thereby cause the brake controlling valve devices 3 on the locomotive to apply the locomotive brakes. He will then move the automatic brake valve handle to lap position and operate the usual brake pipe cut-out cock (not shown) to close communication between the brake pipe and automatic brake valve device following which the handle of said brake valve device will be turned to its usual running position for removal. Next he will turn the cut-out valve device 75 at the control end of the locomotive to its closed position, following which at the control end of the vehicle the automatic brake valve handle is removed in its running position and the independent brake valve handle 58 is removed in its release position. With the brakes on the locomotive thus applied and the two brake valve handles removed, the engineer starts for the opposite end of the locomotive and upon arrival places said handles in the respective brake valve devices and moves the respective cut-off valve device 75 to its open position. He will then operate the independent brake valve device into its application and release zone to ensure an independent application of locomotive brakes; following which he will open the brake pipe cut-out cock to connect the brake pipe to the automatic brake valve device which being in running position will recharge the brake pipe 1 and cause the brake controlling valve devices 3 on the locomotive to move to their brake release position, but the locomotive brakes will remain applied by virtue of the independent brake valve handle being in its application and release zone. In order to release the brakes on the locomotive to permit the locomotive to be moved the independent brake valve handle will be turned to its release position whereupon the locomotive brakes will release in the manner before described.

The construction and operation of the locomotive brake equipment as so far described is the same as in the instruction pamphlet above referred to.

As above mentioned, when the cut-out valve device 75 at the control end of the locomotive is closed preparatory to changing ends, it will be noted that the cut-out valve device 75 at the non-control end of the locomotive is also closed, so that if there should be any leakage of fluid under pressure into the actuating pipe 53, as from the rotary valve chambers 81, a pressure will be obtained there. If while changing ends the pressure in the actuating pipe 53 should thus increase to a degree sufficient to cause the pistons 25 in the selector valve devices 4 to operate the slide valves 5 to the upper position the independent release valve devices 30 will operate to release the application of brakes on the locomotive at a time, it will be noted, when the brake valve devices at both ends of the locomotive are cut-out of operation by the respective closed brake pipe cut-out cocks and closed cut-off valve devices 75. The locomotive then might start to move without control and possible dangerous consequences. According to the invention we obviate this difficulty however by the provision of a small leakage passageway or groove 81a in the wall of the cylinder in which the piston 25 operates. In the lower or normal position of piston 25 this groove 81a opens chamber 26 to the opposite side of packing cup 29 and thence chamber 23 which is open to atmosphere so that if there is any leakage into the actuating pipe 53 through the closed cut-off valve devices 75 while changing control ends of the locomotive, such leakage will be dissipated and thus prevent undesired movement of the selector slide valves 5 to their brake release position for releasing the locomotive brakes. However, when fluid under pressure is intentionally supplied to the actuating pipe 53 to cause operation of the selector valve devices on the locomotive to their release position to effect an intentional release of locomotive brakes, the packing cup 29 will close the upper end of groove 81a to avoid unnecessary loss of fluid under pressure from chamber 26.

*Summary*

It will now be seen that we have provided an improvement in the No. 24RL locomotive brake equipment which will insure against loss of control of the locomotive under circumstances where such loss might be extremely dangerous.

Having now described our invention, what we claim as new and desire to secure by Letters Patent, is:

1. In a fluid pressure brake apparatus, in combination, a pipe, means movable to a brake release position in response to a chosen pressure of fluid in said pipe and to another position upon reduction in pressure of fluid in said pipe below said chosen pressure, two control valve devices connected to spaced apart portions of said pipe and operative to either supply fluid under pressure to said pipe or to vent said pipe, a cut-out valve device for each control valve device for selectively opening and closing communication between said pipe and the respective control valve device, and a leakage passageway for opening said pipe to atmosphere for dissipating leakage of fluid under pressure to said pipe with said cut-out valve devices in their communication closing position.

2. In a fluid pressure brake apparatus, in combination, a pipe, means movable to a brake release position in response to a chosen pressure of fluid in said pipe and to another position upon upon reduction in pressure of fluid in said pipe below said chosen pressure, two control valve devices connected to spaced apart portions of said pipe and operative to either supply fluid under pressure to said pipe or to vent said pipe, a cut-out valve device for each control valve device for selectively opening and closing communication between said pipe and the respective control valve device, and means controlled by the first named means operative in its brake release position to establish a communication with said pipe for dissipating fluid under pressure which may leak into said pipe and operative in its normal position to close the last named communication.

3. Brake apparatus for a double end multiple unit locomotive comprising in combination, means in each unit of the locomotive operative to effect an application of brakes thereon, a pipe extending through the locomotive, means on each unit of the locomotive responsive to a chosen pressure of fluid in said pipe to release the brakes on the unit, a brake valve device on each of the end units of the locomotive operative to supply and release fluid under pressure to and from said pipe, a cut-out valve device for each brake valve device for selectively opening and closing communication between said pipe and the respective brake valve device, and a leakage port opening said pipe to atmosphere.

4. Brake apparatus for a double end multiple unit locomotive comprising in combination, means on each unit of the locomotive operative to effect an application of brakes thereon, a pipe extending through the locomotive, means on each unit including a piston movable to a brake release position by a chosen pressure of fluid in said pipe to release an application of brakes on the unit and movable to a normal position upon reduction in such pressure to a lower degree, a brake valve device on each of the end units of the locomotive selectively operative to either supply fluid under pressure to or vent fluid under pressure from said pipe, a cut-out valve device for each brake valve device for selectively opening and closing communication between said pipe and the brake valve device, and a leakage port controlled by said piston for opening said pipe to atmosphere in the normal position of said piston, said piston closing communication from said pipe to atmosphere through said port in its brake release position.

5. Brake apparatus for a double end multiple unit locomotive comprising in combination, means on each unit of the locomotive operative to effect an application of brakes thereon, a pipe extending through the locomotive, means on each unit of the locomotive controlled by pressure of fluid in said pipe and movable in response to venting of said pipe to a normal position for opening communication through which said application of brakes on the unit is effected and movable in response to a chosen pressure of fluid in said pipe to a brake release position for closing said communication and releasing an application of brakes on the unit, a leakage port from said pipe controlled by the last named means and opened in the normal position thereof and closed in said brake release position, a brake valve device on each of the end units of the locomotive selectively operative to either supply fluid under pressure to or vent fluid under pressure from said pipe, and a cut-out valve device for each brake valve device for selectively opening and closing communication between said pipe and the respective brake valve device.

6. Brake apparatus for a double end multiple unit locomotive comprising in combination, means on each unit of the locomotive operative to effect an application of brakes thereon, a pipe extending through the locomotive, means on each unit of the locomotive responsive to a chosen pressure of fluid in said pipe to release the brakes on the unit, a brake valve device on each of the end units of the locomotive operative to supply and release fluid under pressure to and from said pipe, a cut-out valve device for each brake valve device comprising a casing having a chamber charged with fluid under pressure, a rotary valve in said chamber pressed to its seat by fluid under pressure in said chamber and having one position for opening said pipe to the respective brake valve device and a second position for closing communication between said pipe and the respective brake valve device, means for turning said rotary valve to its different positions, and means for dissipating fluid under pressure from said pipe which may leak from said chambers to said pipe with said cut-out valve devices in said other position.

7. Brake apparatus for a double end multiple unit locomotive comprising in combination, means on each unit operative by fluid under pressure to effect an application of fluid pressure brakes thereon, brake release means on each unit operative by fluid under pressure to open a communication for releasing such fluid under pressure to effect a release of brakes and operative upon venting of said operating fluid under pressure to close said communication, a pipe, selector means on each unit movable in response to a chosen pressure of fluid in said pipe to a brake release position to supply fluid under pressure to operate said brake release means and movable to a normal position upon reduction in pressure in said pipe to below said chosen pressure, means for dissipating leakage of fluid under pressure to said pipe rendered effective by said selector means in its normal position and ineffective in its brake release position, an independent brake valve device on each of the end units of the locomotive operative to either supply fluid under pressure to or release fluid under pressure from said pipe and a cut-out valve device for each of said brake valve devices comprising a casing having a chamber charged with fluid under pressure, a rotary valve in said casing pressed to its seat by the fluid under pressure in said chamber and having one position for opening said pipe to the respective brake valve device and another position for closing communication between said pipe and the respective brake valve device, and a handle for each cut-out valve device for turning the rotary valve therein to its different positions.

ANDREW T. GORMAN.
EARLE S. COOK.

REFERENCES CITED

The following references are of record in the file of this patent:

UNITED STATES PATENTS

| Number | Name | Date |
|---|---|---|
| 1,394,074 | Farmer | Oct. 18, 1921 |
| 1,703,896 | Parke | Mar. 5, 1929 |
| 2,367,618 | Rush | Jan. 16, 1945 |